United States Patent [19]

Shimonou

[11] Patent Number: 5,859,817
[45] Date of Patent: Jan. 12, 1999

[54] OPTICAL DISK APPARATUS AND TRACK ACCESS CONTROL METHOD FOR OPTICAL DISK APPARATUS FOR REDUCING THE RELATIVE POSITION SHIFT BETWEEN TWO BEAM SPOTS WHICH ARE EMITTED THROUGH TWO OBJECTIVE LENSES

[75] Inventor: Shigeru Shimonou, Tokyo, Japan

[73] Assignee: NEC Corporation, Tokyo, Japan

[21] Appl. No.: 928,344

[22] Filed: Sep. 12, 1997

Related U.S. Application Data

[62] Division of Ser. No. 607,637, Feb. 27, 1996, Pat. No. 5,737,282.

[30] Foreign Application Priority Data

Feb. 28, 1995 [JP] Japan ................................. 6-039916

[51] Int. Cl.$^6$ ....................................... G11B 7/00
[52] U.S. Cl. ................ 369/44.28; 369/32; 369/44.37
[58] Field of Search ............................ 369/44.37, 44.32, 369/32, 44.38, 44.29, 112, 44.27, 44.28

[56] References Cited

U.S. PATENT DOCUMENTS

| | | | |
|---|---|---|---|
| 4,706,235 | 11/1987 | Melbye ................................. | 369/44.37 |
| 4,727,528 | 2/1988 | Wyland ................................ | 369/44.37 |
| 4,802,021 | 1/1989 | Makagawa et al. ................ | 369/32 |
| 4,845,696 | 7/1989 | Ohtsuki et al. ..................... | 369/32 |
| 4,881,214 | 11/1989 | Izawa et al. ........................ | 369/44.38 |
| 5,034,941 | 7/1991 | Kasai et al. ........................ | 369/44.37 |
| 5,086,419 | 2/1992 | Yanagi ................................ | 369/44.32 |
| 5,090,044 | 2/1992 | Ohsato et al. ....................... | 369/44.37 |
| 5,105,410 | 4/1992 | Maeda et al. ........................ | 369/44.37 |
| 5,161,243 | 11/1992 | Ishida et al. ........................ | 369/44.37 |
| 5,222,055 | 6/1993 | Fujita .................................. | 369/44.37 |
| 5,237,547 | 8/1993 | Ohkuma et al. ..................... | 369/32 |
| 5,303,216 | 4/1994 | Shinoda et al. ..................... | 369/44.36 |
| 5,341,353 | 8/1994 | Yoshio et al. ....................... | 369/44.32 |
| 5,444,684 | 8/1995 | Yanagi et al. ....................... | 369/44.37 |
| 5,493,554 | 2/1996 | Sasaki et al. ........................ | 369/44.37 |
| 5,594,711 | 1/1997 | Koyama ............................... | 369/44.37 |

FOREIGN PATENT DOCUMENTS

| | | |
|---|---|---|
| 61-250846 | 7/1986 | Japan . |
| 3263638 | 11/1991 | Japan . |

*Primary Examiner*—Nabil Hindi
*Attorney, Agent, or Firm*—Sughrue, Mion, Zinn, Macpeak & Seas, PLLC

[57] ABSTRACT

An optical disk apparatus includes first and second objective lenses, a carriage, a moving mechanism, a fixed optical system, a main control section, track access control circuits, a first positional shift correction circuit, a second positional shift correction circuit, first and second driving members, an arithmetic circuit, and a correction member. The first and second driving members slightly drive the first and second objective lenses in a track crossing direction in accordance with the first and second positional shift correction signals, respectively. The first and second positional shift correction circuits count first and second track position signals to output first and second positional error signals with respect to a target track, and output the first and second positional shift correction signals to the first and second driving members based on the first and second positional error signals and the first and second track position signals, respectively. The arithmetic circuit calculates a difference between the first and second positional error signals to output an inter-beam positional shift signal. The correction member corrects one of the first and second positional shift correction signals based on the inter-beam positional shift signal.

5 Claims, 5 Drawing Sheets

OPTICAL DISK APPARATUS AND TRACK ACCESS CONTROL METHOD FOR OPTICAL DISK APPARATUS FOR REDUCING THE RELATIVE POSITION SHIFT BETWEEN TWO BEAM SPOTS WHICH ARE EMITTED THROUGH TWO OBJECTIVE LENSES

This is a divisional of application Ser. No. 08/607,637 filed Feb. 27, 1996, now U.S. Pat. No. 5,737,282.

BACKGROUND OF THE INVENTION

The present invention relates to an optical disk apparatus for optically recording and reproducing information and, more particularly, to a track access control method in which a plurality of beam irradiation lenses (objective lenses) are arranged in series with each other in a recording/reproducing direction, and information is recorded at a high speed by erasing/recording information with a preceding beam and by recording/reproducing information with a following beam, and an optical disk apparatus using this method.

In an optical disk apparatus for optically writing and reading information in and from a disk-like recording carrier, and particularly a magneto-optical disk apparatus having an information rewrite function, two beam irradiation cycles, i.e., a cycle for irradiating a light beam to erase information, and a cycle for irradiating a modulated light beam for recording new information are required.

To eliminate a cumbersome recording procedure and shorten the processing time in such a magneto-optical disk apparatus, an optical disk or a magneto-optical disk apparatus separately using an information erasing beam and an information recording/reading beam has been proposed.

For example, an arrangement in which two light beams are emitted through one objective lens to use one for erasing information and the other for recording/reading information is disclosed in Japanese Patent Laid-Open No. 61-250846.

Although the arrangement in which the erasing beam and the recording beam are close to each other is effective for a phase change type rewritable optical disk which requires no external magnetic field for recording and erasing, this arrangement is difficult to be applied to the magneto-optical disk apparatus. In the magneto-optical disk apparatus in which recording and erasing magnetic fields must be inverted, positions where the recording and erasing magnetic fields applied to a medium must be spaced apart from each other by a certain distance. It is preferable to irradiate beams focused by corresponding objective lenses on erasing and recording positions, respectively.

A magneto-optical disk apparatus having such light beams is disclosed in, e.g., Japanese Patent Laid-Open No. 3-263638. In this example, a head for forming a spot for recording/erasing information, and a head for forming a spot for reproducing information are mounted on the same carriage, and the erasing/recording spot precedes the reproducing spot on the same track by a predetermined distance.

In the optical disk apparatus in which the separate optical heads or objective lenses are arranged in order to irradiate two beams on positions relatively apart from each other on a medium, and are mounted on the same carriage to move the beams in the radial direction of the disk (direction perpendicular to a track), the relative positions of the two beams must be kept almost constant with respect to a track on the disk. Particularly, in recording and reading operations, the two beams must be present on the same track.

To allow the two beams to rapidly reach the same track upon completion of a track access, the two beams desirably move following almost the same trace without greatly shifting the relative positions of the two beams during the inter-track movement of the beams (track access).

On the other hand, a preferable track access control method for the apparatus having the two objective lenses or optical heads mounted on the same carriage has not been attained.

One of easily assumed methods is a method of stopping (activating a stop servo) the objective lenses with respect to the reference axis of a carriage or head in a track access to move the carriage with reference to a track position signal detected from either beam.

In this method, however, the relative positional precision of the two beams during the track access depends on the positional precision of the lens stop servo and the servo characteristics, and a precision enough to position the beams on the same track cannot be expected. Therefore, at the end of the carriage movement, the positions of the two beams are greatly shifted from each other. To align the two beams on a target track, the beams must be precisely sought (track jump seek), requiring a long period of time.

In the optical disk apparatus in which a plurality of objective lenses are mounted on the same carriage to simultaneously perform erasing and recording operations, the time required for a track access in which beams are moved to a target track is greatly prolonged.

SUMMARY OF THE INVENTION

It is an object of the present invention to provide an optical disk apparatus capable of correctly moving two beams to the same target track at a high speed while reducing a positional shift therebetween when objective lenses mounted on a carriage to irradiate the two beams are transferred to another same track, and a track access method for the optical disk apparatus.

In order to achieve the above object, according to the present invention, there is provided an optical disk apparatus comprising first and second objective lenses respectively for outputting first and second light beams on the same track on an optical disk, the first and second beams separately recording, reproducing, and erasing information on the same track, first and second driving means respectively for slightly driving the first and second objective lenses in a track crossing direction in accordance with a first and a second positional shift correction signals, a carriage on which the first and second objective lenses are mounted, a moving mechanism for moving the carriage between tracks, a fixed optical system for emitting the first and second beams on the optical disk and detecting the beams reflected by the optical disk through the first and second objective lenses, and extracting first and second track position signals from the detected reflected beams of the first and second beams, main control means for controlling an operation of the moving mechanism, and controlling an information recording/reproducing/erasing operation using the first and second objective lenses through the fixed optical system, track access control means for controlling the movement of the carriage between the tracks based on the first and second track position signals from the fixed optical system, first positional shift correction means for counting the first track position signal from the fixed optical system to output a first positional error signal with respect to a target track, and outputting the first positional shift correction signal to the first driving means based on the first positional error signal and the first track position signal, second positional shift correction means for counting the second track position signal from the fixed optical system to output a second positional error signal with respect to the target track, and outputting the second positional shift correction signal to the second driving means based on the second positional error signal and the second track position signal, arithmetic means for calculating a difference between the first and second positional error signals from the first and second positional shift correction means to output an inter-beam positional shift signal, and correction means for correcting one of the first and second positional shift correction signals from the first and second positional shift correction means based on the inter-beam positional shift signal from the arithmetic means.

DESCRIPTION OF THE PREFERRED EMBODIMENT

An embodiment of the present invention will be described below with reference to FIGS. 1 to 6.

Figure 1:
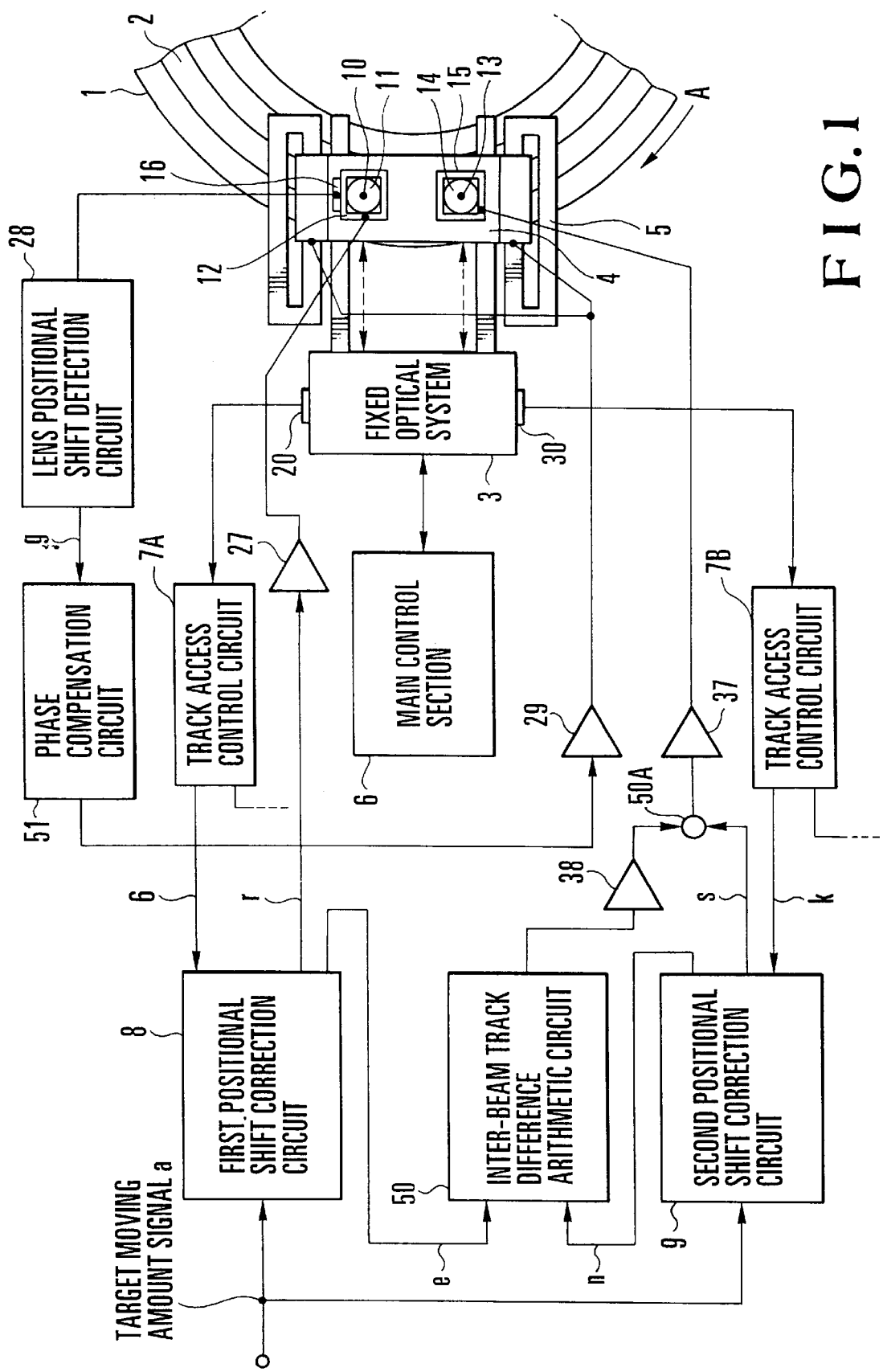
FIG. 1 is a schematic block diagram showing an optical disk apparatus according to an embodiment of the present invention.

Referring to FIG. 1, reference numeral 1 denotes an optical disk; and 2, tracks on the optical disk 1. First and second objective lenses 11 and 14 are disposed on the optical disk 1 such that the objective lenses 11 and 14 can be reciprocally moved from the peripheral end portion of the optical disk 1 toward its central portion to irradiate two beams on the same track 2.

An optical disk apparatus of this embodiment comprises a carriage actuator 5 serving as a moving mechanism for moving a carriage 4, on which the two objective lenses 11 and 14 are mounted, to the same track position, a main control section 6 for controlling the operation of the carriage actuator 5, and for controlling the write/read access of predetermined information by the first and second objective lenses 11 and 14 through a fixed optical system 3, and track access control circuits 7A and 7B serving as track access control means for controlling the movement of the carriage 4 between the tracks 2 on the basis of track position information obtained by the fixed optical system 3.

In this embodiment shown in FIGS. 1 to 6, an error which occurs in moving two light beams between the tracks in the optical disk apparatus will be minimized. The important feature of this embodiment lies in that positional errors of the light beams with respect to a target track are detected, a difference between the positional errors is calculated to use the result as a positional shift signal indicating the positional shift between the beams, and this positional shift signal is added as a correction value in moving one of the light beams.

To realize this, the track access control circuits 7A and 7B of this embodiment are respectively equipped with first and second positional shift correction circuits 8 and 9 for independently, slightly adjusting the positions of the first and second objective lenses 11 and 14, and the like.

The first positional shift correction circuit 8 has a function of counting first track position signals (track pulses) b which are detected by the first light beam, obtained by the fixed optical system 3, and supplied from the track access control circuit 7A, thereby outputting a first positional error signal e with respect to a target track. In addition, the first positional shift correction circuit 8 also has a function of outputting a positional shift correction signal r for the first objective lens on the basis of the first positional error signal e and the first track position signal b.

The second positional shift correction circuit 9 has a function of counting second track position signals (track pulses) k which are detected by the second light beam, obtained by the fixed optical system 3, and supplied from the track access control circuit 7B, thereby outputting a second positional error signal n with respect to the target track. In addition, the second positional shift correction circuit 9 also has a function of outputting a positional shift correction signal s for the second objective lens on the basis of the second positional error signal n and the second track position signal k.

The carriage 4 is independently equipped with lens actuators 12 and 15 serving as first and second driving means which are driven and controlled by the corresponding first and second positional shift correction circuits 8 and 9 to slightly drive the corresponding objective lenses 11 and 14 in the track crossing direction.

Further, the optical disk apparatus is equipped with an inter-beam track difference arithmetic device 50 for calculating a difference between the first positional error signal e output from the first positional shift correction circuit 8 and the second positional error signal n output from the second positional shift correction circuit to form and output an inter-beam positional shift signal q, and an addition circuit 50A for correcting the output s from the second positional shift correction circuit 9 on the basis of the output signal q from the inter-beam track difference arithmetic device 50.

FIG. 1 shows a track access control apparatus in the optical disk apparatus according to the embodiment of the present invention. The two objective lenses 11 and 14 are mounted on the carriage (moving mechanism) movable in the radial direction of the optical disk 1. Beams emitted through the objective lenses are condensed to be irradiated on the recording surface of the optical disk 1 as first and second beam spots 10 and 13, respectively. Note that each light beam is focused and condensed on the recording surface of the disk by focus control (focus servo).

The disk 1 is rotated by a spindle motor (not shown) in a rotational direction indicated by an arrow A. A large number of information tracks 2 are formed on the recording surface of the disk 1. In an information record/read access, the beam spots 10 and 13 are controlled to follow a target track 2.

The lens actuators 12 and 15 for moving the corresponding objective lenses in the radial direction of the disk are mounted on the carriage 4. The objective lenses 11 and 14 are coupled to the corresponding lens actuators 12 and 15.

A pair of laser beam sources for generating two light beams, and a pair of photodetectors for receiving the two beams reflected by the disk are arranged not on the carriage but inside the fixed optical system 3. The fixed optical system 3 is fixed with respect to the optical disk 1, and only light beams reciprocate between the fixed optical system 3 and the carriage 4. A first track error detector 20 attached to the fixed optical system 3 receives the reflected beam of the first beam spot 10 to detect a positional shift of the first beam spot with respect to an information track.

Figure 2:
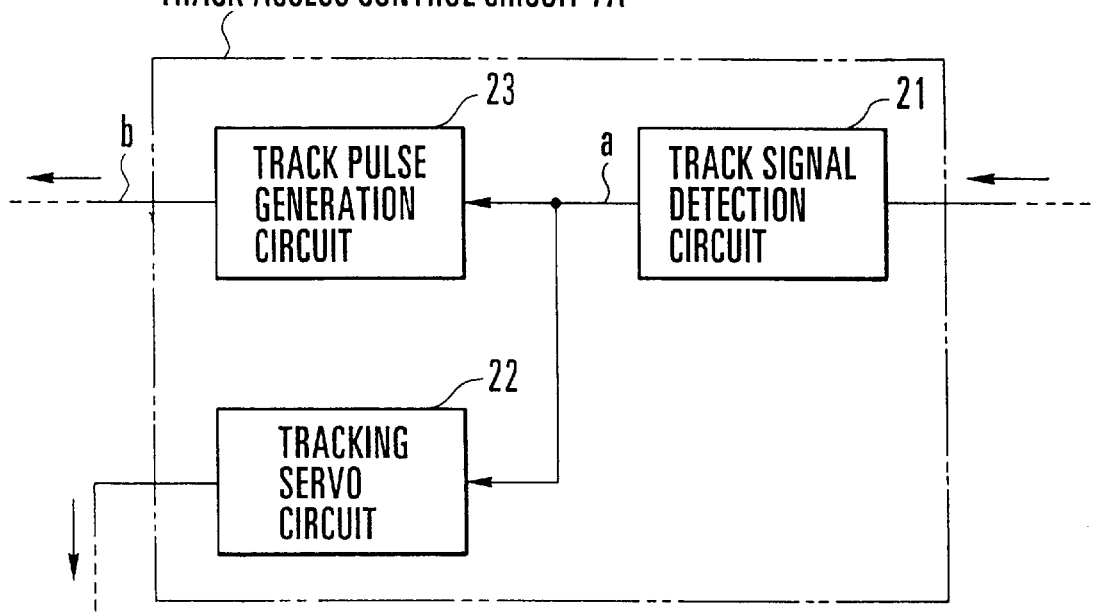
FIG. 2 is a block diagram showing an arrangement of a track access control circuit 7A shown in FIG. 1.

The track error detector 20 is constituted by, e.g., a two-divided photodetector. The track error detector 20 detects a change in reflected beam (change in intensity distribution) caused by a positional shift of a beam spot with respect to an information track to output a current corresponding to the positional shift of the beam with respect to the center of the track to the track access control circuit 7A. A track signal detection circuit 21 in the track access control circuit 7A receives the current signal from the track error detector 20 to generate a track error signal a indicating the positional shift amount of the beam spot 10 with respect to the center of the track, as shown in FIG. 2.

On the other hand, a lens position detector 16 is attached to the lens actuator 12 to detect the movement of the objective lens 11 in the radial direction of the disk 1. In this embodiment, the lens position detector 16 is constituted by a reflection position sensor in which an LED element is arranged at the center, and photodiodes are arranged on the two sides. The output terminal of the lens position detector 16 is connected to a lens positional shift detection circuit 28.

The lens positional shift detection circuit 28 generates a lens position signal g indicating a positional shift of the objective lens 11 with respect to the reference position of the carriage 4. The lens position signal g is input to a power amplifier 29 through a phase compensation circuit 51. The power amplifier 29 amplifies this input signal. The amplified signal is supplied to the carriage actuator 5 to drive it so as to correct the positional shift between the carriage 4 and the objective lens 11, i.e., to reduce the lens position signal to almost "0". Upon reception of this lens position signal, a loop for driving the carriage 4 is activated to cause the carriage 4 to follow the movement of the objective lens 11.

The carriage 4 follows the lens 11 while the beam spot 10 moves between the tracks. When the beam spot 10, i.e., the objective lens 11 moves in the radial direction of the disk 1, the carriage 4 also follows this movement and moves in the radial direction.

The track error signal a output from the track signal detection circuit 21 is input to a tracking servo circuit 22 and a track pulse generation circuit 23, as shown in FIG. 2. The tracking servo circuit 22 is a circuit for keeping the beam spot 10 on a current track (to cause the beam spot 10 to follow the track). The tracking servo circuit 22 has a function of correcting the phase of the track error signal a, amplifying it, and supplying a driving current to the lens actuator.

The track signal detection circuit 21, the tracking servo circuit 22, and the track pulse generation circuit 23 constitute the track access control circuit 7A.

Upon reception of the track error signal a, the track pulse generation circuit 23 detects its zero-crossing point to output a track pulse b indicating that the light beam crosses a track.

Figure 4:
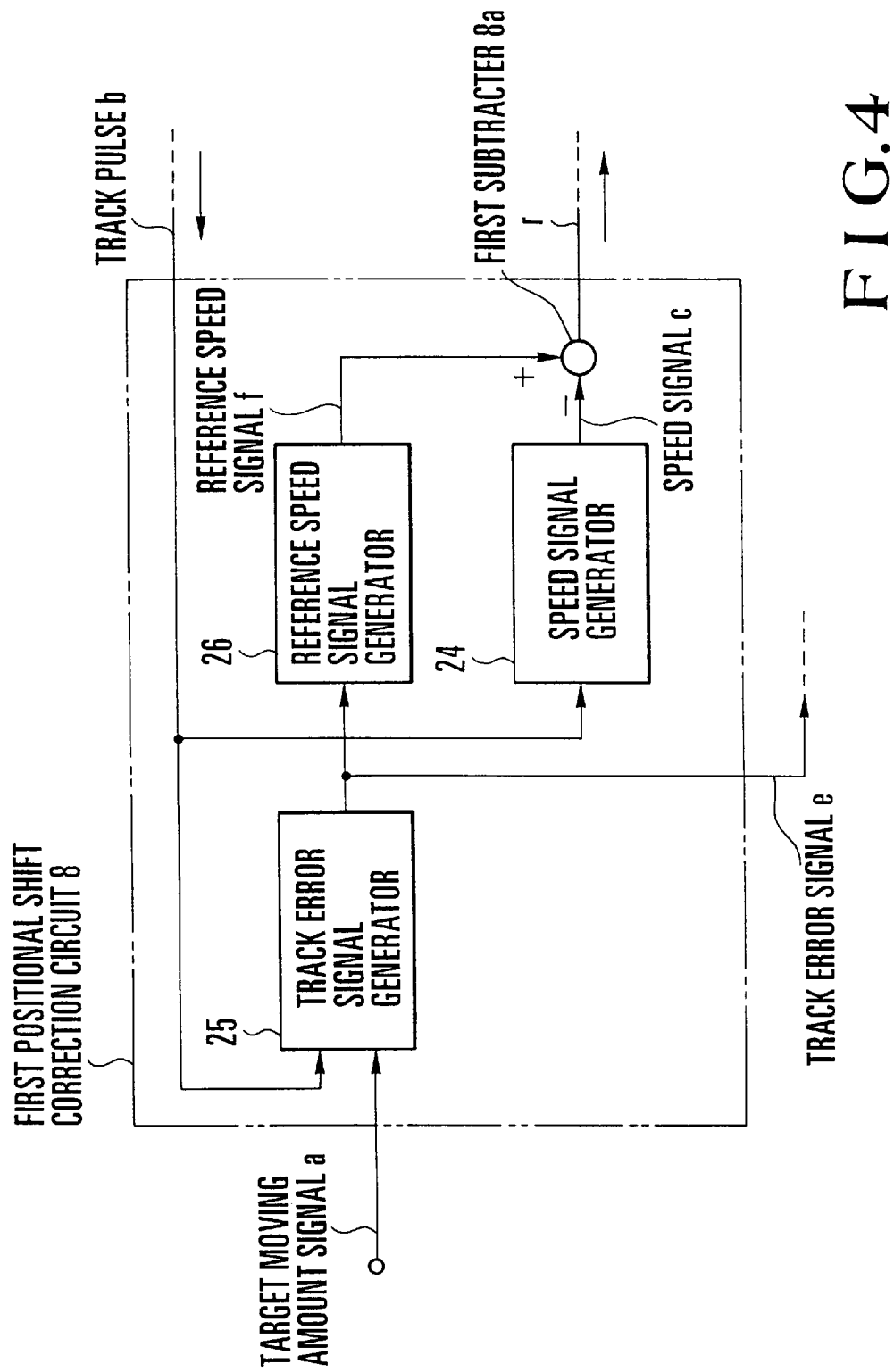
FIG. 4 is a block diagram showing an arrangement of a first positional shift correction circuit shown in FIG. 1.

A speed signal generator 24, in the first positional shift correction circuit 8, which receives the output from the track pulse generation circuit 23, is constituted by, e.g., an F/V conversion (frequency/voltage conversion) circuit, as shown in FIG. 4. Upon reception of the track pulse b, the speed signal generator 24 outputs a speed signal c indicating the speed of the beam spot 10 moving across tracks.

On the other hand, a track error signal generator 25 which also receives the output from the track pulse generation circuit 23 externally receives a target movement amount signal α indicating a distance from the current position of the beam spot to a target track (i.e., the number of tracks to be crossed) at the start of moving the beam spot 10, as shown in FIG. 4. The track error signal generator 25 counts down the target movement amount signal α in accordance with the track pulses b generated upon the movement of the beam spot 10 to output the track error signal e indicating a remaining distance (track number) to the target track for the moving light beam spot 10. A reference speed signal generator 26 generates a reference speed signal f for defining the moving speed of the beam spot 10 on the basis of the track error signal e. A difference between the reference speed signal f and the speed signal c is calculated by a first subtracter 8a to output the positional shift correction signal r.

The speed signal generator 24, the track error signal generator 25, the reference speed signal generator 26, and the first subtracter 8a constitute the first positional shift correction circuit 8.

The positional shift correction signal r from the first subtracter 8a is input to a power amplifier 27. The power amplifier 27 amplifies the positional shift correction signal r to supply it as a correction signal for driving the lens actuator 12 in the target track direction to the lens actuator 12.

With such a control operation, the beam spot 10 is moved to the target track. The radial movement of the lens actuator 12 is detected by the lens position detector 16, and the carriage 4 is driven in response to the lens position signal g so as to follow the movement of the objective lens 11, as described above. The carriage 4 is therefore moved to the target track direction at the same time the beam spot 10 is moved.

On the other hand, the second beam spot 13 is required to perform almost the same movement as that of the first beam spot 10 and to reach the same target track.

For this purpose, the fixed optical system 3 is equipped with a second track error detector 30 to detect a positional shift of the second beam spot 13 with respect to an information track.

Figure 3:
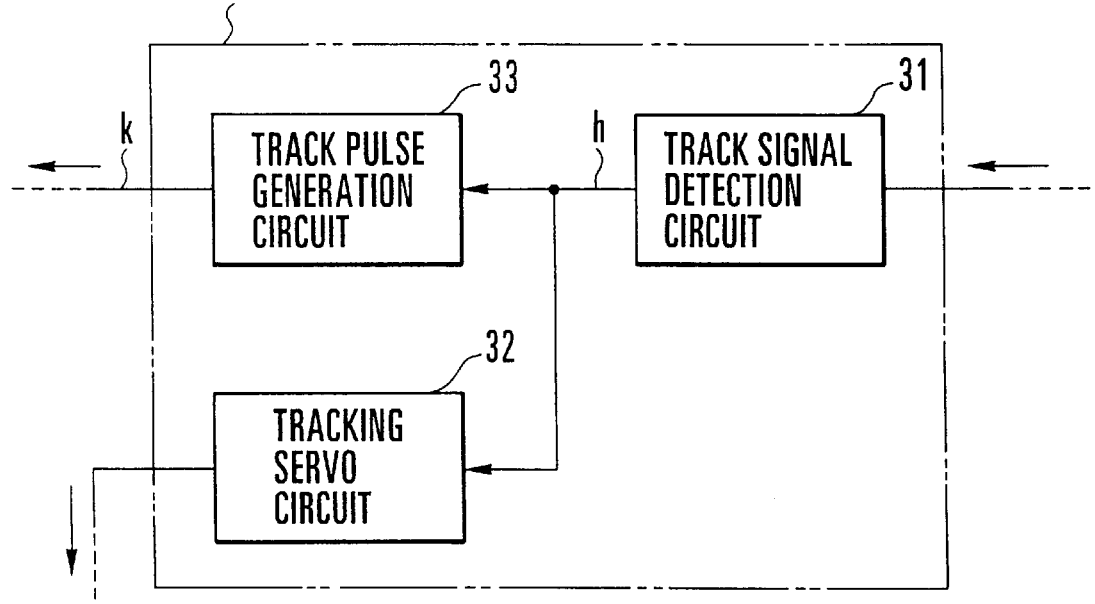
FIG. 3 is a block diagram showing an arrangement of a track access control circuit 7B shown in FIG. 1.

As shown in FIG. 3, a track signal detection circuit 31 in the track access control circuit 7B, which receives an output from the second track error detector 30, receives a current signal from the track error detector 30 to generate a track error signal h indicating the positional shift amount of the beam spot 13 with respect to the center of the track. The track error signal h is input to a tracking servo circuit 32 and a track pulse generation circuit 33. The tracking servo circuit 32 is a circuit for keeping the beam spot 13 on a current track (to cause the beam spot 13 to follow the track). The tracking servo circuit 32 has a function of correcting the phase of the track error signal h, amplifying it, and supplying a driving current to the lens actuator 15.

The track signal detection circuit 31, the tracking servo circuit 32, and the track pulse generation circuit 33 constitute the track access control circuit 7B.

The track pulse generation circuit 33 which receives the track error signal h from the track signal detection circuit 31 detects its zero-crossing point upon reception of the track error signal h to output a track pulse k indicating that the beam spot 13 crosses a track.

Figure 5:
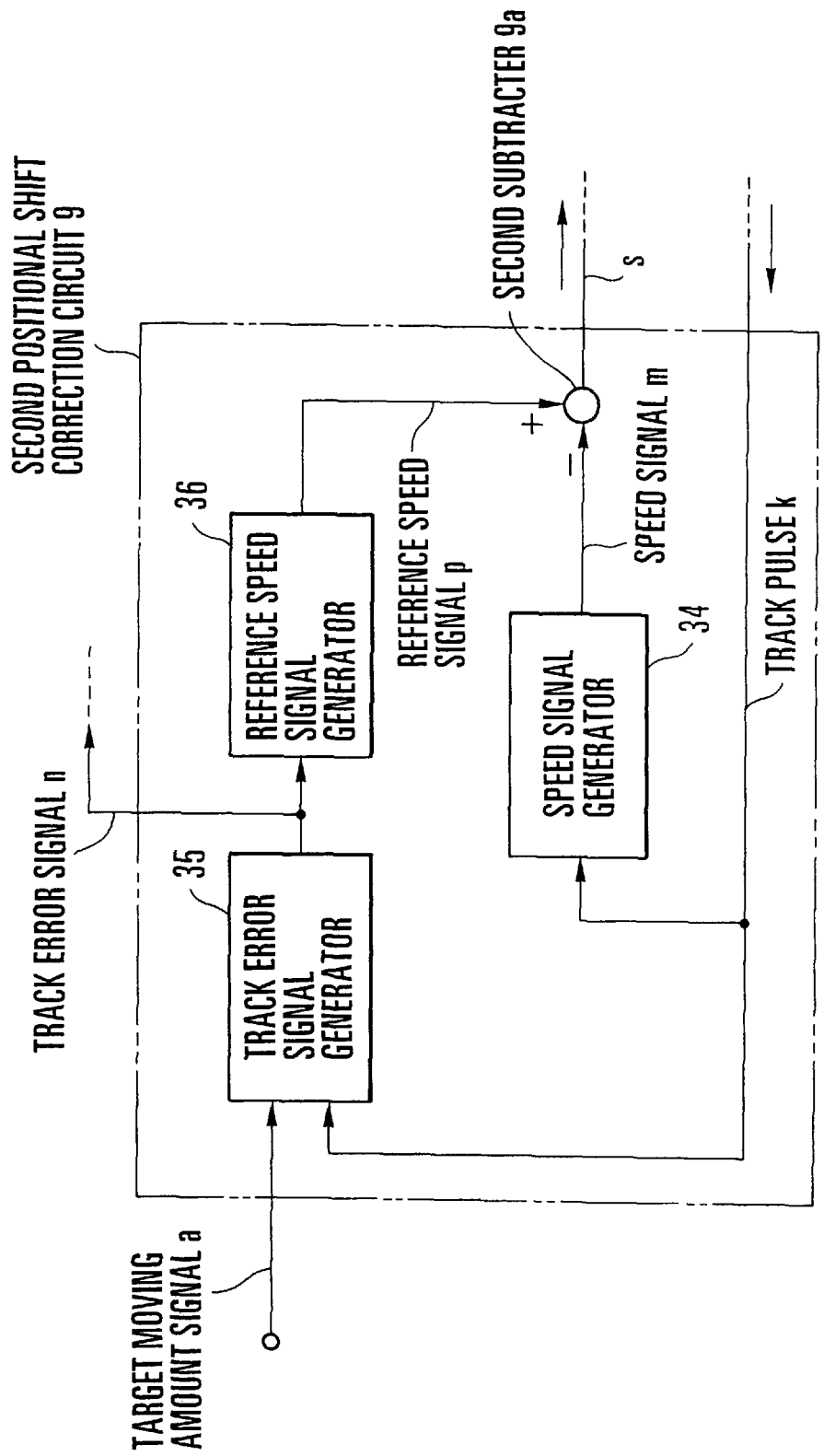
FIG. 5 is a block diagram showing an arrangement of a second positional shift correction circuit shown in FIG. 1.

A speed signal generator 34, in the second positional shift correction circuit 9, which receives the output from the track pulse generation circuit 33, is constituted by, e.g., an F/V conversion (frequency/voltage conversion) circuit, as shown in FIG. 5. Upon reception of the track pulse k, the speed signal generator 34 outputs a speed signal m indicating the speed of the beam spot 13 moving across tracks. At the start of moving the beam spots 10 and 13, a track error signal generator 35 which also receives the output from the track pulse generation circuit 33 receives the target movement amount signal α indicating a distance from the current position of the beam spot 13 to the target track (i.e., the number of tracks to be crossed) at the same time when the track error signal generator 25 receives the target movement amount signal α. The track error signal generator 35 counts down the target movement amount signal α in accordance with the track pulses k generated upon the movement of the beam spot 13 to output the track error signal n indicating a remaining distance (track number) to the target track for the moving light beam spot 13. A reference speed signal generator 36 generates a reference speed signal p for defining the moving speed of the beam spot 13 on the basis of the track error signal n.

A difference between the reference speed signal p and the speed signal m is calculated by a second subtracter 9a to output the positional shift correction signal s.

The speed signal generator 34, the track error signal generator 35, the reference speed signal generator 36, and the second subtracter 9a constitute the second positional shift correction circuit 9.

The positional shift correction signal s from the second subtracter 9a is input to a power amplifier 37. The power amplifier 37 amplifies the positional shift correction signal s to supply it as a correction signal for driving the lens actuator 15 in the target track direction to the lens actuator 15.

With such a control operation, the beam spot 13 is moved to the target track. In this manner, the movement control method and the arrangement of the control system for the beam spot 13 are almost the same as those for the beam spot 10. Therefore, the beam spot 13 (i.e., the objective lens 14) and the beam spot 10 (i.e., the objective lens 11) perform almost the same operation to move to the target track.

On the other hand, the characteristics of the lens actuator 12 are slightly different from those of the lens actuator 15. In addition, the speed signals c and m respectively generated by the speed signal generators 24 and 34 have a slight error therebetween.

If, therefore, the movements of the two beam spots are separately controlled by the two control systems arranged separately, the moving speeds of the two beam spots may be slightly different from each other. As a result, a positional shift between the two beams 10 and 13 increases with a lapse of moving time. If this relative positional shift is not corrected, the position of the objective lens 14 is shifted from the objective lens 11. In this case, the position of the objective lens 14 is greatly shifted from the carriage 4 because the carriage 4 is moved to follow the objective lens 11.

If the position of the objective lens 14 is greatly shifted from the carriage 4, the condensing properties of the beam spots are degraded to make correct detection of a track error signal difficult, resulting in unstable movement control (speed control) of the beams. In addition, the positional shift between the two beams is greatly increased at the end of the movement, so that a moving operation for correction must be performed to reach the target track.

To reduce a positional shift between two beam spots in moving across tracks, a feedback loop for detecting the positional shift between the beams, and adjusting the movements of the beams so as to reduce the positional shift is added to the track access control system in this embodiment.

More specifically, the track error signals e and n output from the corresponding track error signal generators 25 and 35 respectively shown in FIGS. 4 and 5 are input to the inter-beam track difference arithmetic device 50. The track error signal e indicates a positional shift (distance) of the beam spot 10 with respect to the target track, while the track error signal n indicates a distance to the target track for the beam spot 13. A difference between the two track error signals e and m indicates a positional shift between the two beams.

The inter-beam track difference arithmetic device 50 calculates the difference between the track error signals e and n to output the inter-beam positional shift signal q indicating a relative positional shift between the two beams 10 and 13. The gain of the inter-beam positional shift signal q is adjusted to a proper level by a level adjustment circuit 38 and input to the power amplifier 37 so as to be added to the signal s (speed error signal) indicating a difference between the reference speed signal p and the speed signal m.

More specifically, the power amplifier 37 receives the signal corresponding to the positional shift of the beam spot 13 with respect to the beam 10 in addition to the signal s indicating an error of the speed signal m with respect to the reference speed signal p (i.e., the signal corresponding to a speed error of the beam spot 13 with respect to a target speed). Upon reception of these signals, the power amplifier 37 supplies a driving signal for correcting the positional shift between the beam spots 10 and 13 to the lens actuator 15. That is, the objective lens 14 is accelerated when the beam 13 has a delay with respect to the beam spot 10, while the objective lens 14 is slightly slowed down when the beam 13 precedes the beam 10.

With such a correction operation for a relative positional shift between beams, the two beam spots 10 and 13 move following almost the same trace in moving across tracks while keeping almost the same positional relationship, and reach almost the same track.

The moving speed of the beam spot 10 is preferably equal to that of the beam spot 13, as much as possible. The reference speed signals f and m may be identical to each other.

More specifically, the reference speed signal generator 36 shown in FIG. 5 for the second beam spot is not necessarily arranged, and the reference speed signal f for the first beam may be used as a reference speed signal for the second beam spot. In this case, the reference speed signal generator 36 is unnecessary. The reference speed signal f output from the reference speed signal generator 26 also serves as a reference for the speed signal m, and a difference between the reference speed signal f and the speed signal m is input to the power amplifier 37.

In the above description, the control apparatus of the present invention is constituted by circuit blocks having individual functions. This arrangement, however, is only an example for facilitating the explanation of the function and operation of the control apparatus of the present invention. The main part of the functions of the apparatus according to the present invention may be realized by program processing with a digital signal processor (DSP).

For example, in the arrangements shown in FIGS. 1, 4, and 5, the track error signal generators 25 and 35, the reference speed signal generators 26 and 36, the speed signal generators 24 and 34, the inter-beam track difference arithmetic device 50, the arithmetic operation of calculating an error between the reference speed signal f and the speed signal c, the arithmetic operation of calculating an error between the reference speed signal p and the speed signal m, and the arithmetic operation of level-adjusting the inter-beam positional shift signal q to add the obtained signal to the difference between the reference speed signal p and the speed signal m may be realized by the digital signal processor. In this case, a D/A converter for converting a digital signal output from this digital signal processor into an analog signal (voltage signal) capable of being input to the power amplifiers 27 and 37 is arranged between the power amplifiers 27 and 37.

An operation will be described below with reference to FIGS. 6A to 6C.

Figure 6A:
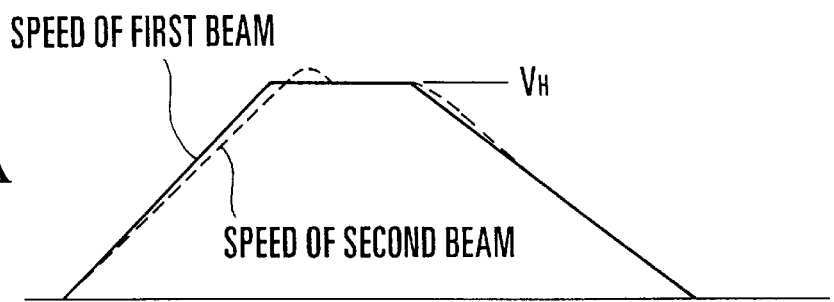
FIG. 6A is a chart illustrating waveforms of the speeds of the first and second beam spots.
Figure 6B:
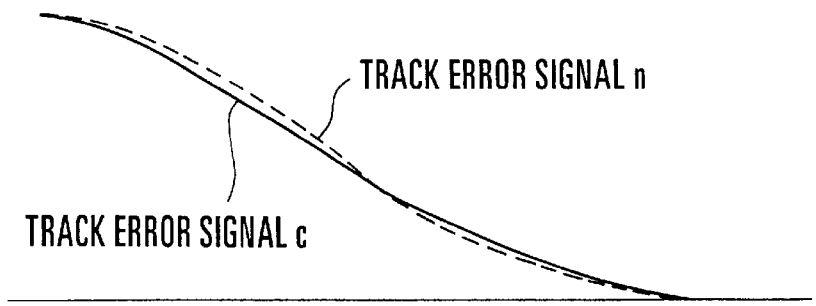
FIG. 6B is a chart showing waveforms of changes in track error signals e and n of the first and second beams during a track access.
Figure 6C:
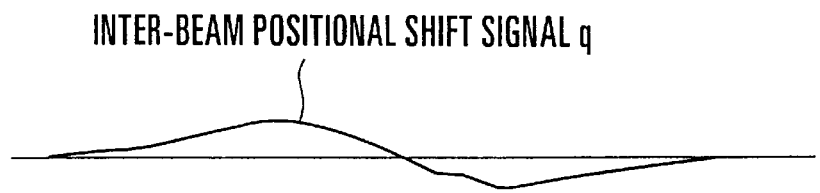
FIG. 6C is a chart showing a waveform of a positional shift signal q indicating a positional shift between the two beams.

FIG. 6A shows schematic waveforms of the speeds of the first and second beam spots 10 and 13 during a beam moving operation. FIG. 6B shows an example of a waveform of the track error signal e (converted into an analog value) corresponding to a positional error (distance) of the first beam spot 10 with respect to a target track, and a waveform of the track error signal n (converted into an analog value) corresponding to a positional error of the second beam spot 13 with respect to the target track.

In moving the beams between tracks (track access), the lens actuators are accelerated in the target track direction in accordance with the reference speed signals to gradually increase the speeds of the beam spots. When the speeds of the beams reach maximum speed level $V_H$, the acceleration is stopped, and the beams travel at a constant speed ($V_H$). When the beam spots come near the target track with a predetermined distance, the reference speed signals are reduced to slow down the beam spots.

When the beam spots reach the target track, the level of the track error signals goes to "0", and the reference speed signals are also set to be "0" to stop the movement of the beam spots. In the movement between tracks, if the speeds and traces of the two beams completely coincide with each other, the two beam spots 10 and 13 move without any relative positional shift. In practice, however, the speeds of the two beam spots become different from each other due to causes such as a difference in the characteristics of the lens actuators 12 and 15 and a slight error between the speed signal generators 24 and 34. Due to the different speeds, the positions of the two beams are gradually shifted from each other to generate a difference between the track error signals e and n.

The inter-beam track difference arithmetic device 50 shown in FIG. 1 calculates the difference between the track error signals e and n to generate the inter-beam positional shift signal q. FIG. 6C shows an example of a waveform of the inter-beam positional shift signal q (converted into an analog value). The inter-beam positional shift signal is level-corrected and input to the power amplifier 37 to drive the objective lens 14 so as to reduce a positional shift of the beam spot 13 with respect to the beam spot 10. That is, if the beam spot 13 has a delay with respect to the beam spot 10 to increase the positional error between the beams, the objective lens 14 is further accelerated to suppress the positional shift between the beam spots.

In this manner, even if a slight positional shift is generated between the beam spots during the movement of the beam spots 10 and 13, the objective lens 14 is accelerated or decelerated so as to correct the positional shift, and the positional shift between the beam spots does not increase but is reduced to a small value. Since the relative positional shift between the beam spots is not integrated even during moving the beams for a long distance, the relative positional shift becomes almost "0" at a portion near the target track where the beam speeds are low. Therefore, not only the positional shift between the beam spots can be reduced during the movement of the beams, but also the two beams can reach almost the same track without generating almost no positional shift between the beam spots at the end of the movement.

As has been described above, according to the present invention, when two beam spots are moved between tracks, a relative difference between the positional error signals of the beam spots with respect to a target track is calculated to use it as a signal indicating the positional shift between the two beam spots in order to correct the movement of one beam. With this operation, the relative positional shift between the two beam spots which are separately emitted through two objective lenses mounted on the same carriage can be certainly reduced during a track access, and the beams are controlled to almost accurately reach the same target track. Therefore, a new, excellent optical disk apparatus capable of moving the two beams at a high speed with a high precision can be provided.

What is claimed is:

1. A track access control method comprising the steps of:

detecting a first positional error signal of a first light beam with respect to a target track of an optical disk;

detecting a second positional error signal of a second light beam with respect to the target track, the first and second light beams interlockingly moving between tracks;

calculating a difference between the first and second positional error signals to obtain an inter-beam positional shift signal indicating a positional shift between the first and second light beams;

correcting one of signals for correcting the positional shift between the first and second light beams in accordance with the obtained inter-beam positional shift signal when the first and second light beams are moved between the tracks; and slightly driving the first and second light beams in a track crossing direction in accordance with the corrected signal for correcting the positional shift between the first and second light beams.

2. A method according to claim 1, wherein the step of correcting comprises the steps of:

extracting a first track position signal from a reflected beam of the first light beam by said optical disk;

generating a first positional shift correction signal for the first light beam based on the first positional error signal and the first track position signal;

extracting a second track position signal from a reflected beam of the second light beam by said optical disk;

generating a second positional shift correction signal for the second light beam based on the second positional error signal and the second track position signal; and adding the inter-beam positional shift signal to one of the first and second positional shift correction signals.

3. A method according to claim 2, wherein the step of generating a first positional shift correction signal comprises the steps of:

counting the first track position signal to generate the first positional error signal with respect to the target track;

generating a first reference speed signal for defining an inter-beam moving speed of the first light beam based on the first positional error signal;

generating a first speed signal indicating a moving speed of the first light beam in the track crossing direction; and calculating an error of the first speed signal with respect to the first reference speed signal to generate the first positional shift correction signal.

4. A method according to claim 2, wherein the step of generating a second positional shift correction signal comprises the steps of:

counting the second track position signal to generate the second positional error signal with respect to the target track;

generating a second reference speed signal for defining an inter-beam moving speed of the second light beam based on the second positional error signal;

generating a second speed signal indicating a moving speed of the second light beam in the track crossing direction; and calculating an error of the second speed signal with respect to the second reference speed signal to generate the second positional shift correction signal.

5. An optical disk apparatus comprising:

a carriage;

a first and second objective lenses movably mounted on said carriage;

a light source for producing first and second light beams that are output through the first and second objective lenses, respectively;

a tracking access control circuit controlling the first and second light beams to concurrently trace the same track;

a feedback loop for detecting positional shift between said first and second light beams; and a correction circuit responsive to said feedback loop for reducing the positional shift of said first and second light beams.

* * * * *